US009604551B2

(12) United States Patent
Kim et al.

(10) Patent No.: US 9,604,551 B2
(45) Date of Patent: Mar. 28, 2017

(54) APPARATUS FOR LOCKING SEAT-RAIL IN VEHICLE AND MANUFACTURING METHOD THEREOF

(71) Applicant: HYUNDAI DYMOS INCORPORATED, Seosan-si (KR)

(72) Inventors: Hyun Soo Kim, Seoul (KR); Jong Tak Lee, Gwangmyeong-si (KR)

(73) Assignee: HYUNDAI DYMOS INCORPORATED, Seosan-si (KR)

( * ) Notice: Subject to any disclaimer, the term of this patent is extended or adjusted under 35 U.S.C. 154(b) by 0 days.

(21) Appl. No.: 14/982,062

(22) Filed: Dec. 29, 2015

(65) Prior Publication Data

US 2016/0193942 A1 Jul. 7, 2016

(30) Foreign Application Priority Data

Dec. 30, 2014 (KR) .................... 10-2014-0193206

(51) Int. Cl.
*B60N 2/00* (2006.01)
*B60N 2/08* (2006.01)
*B60N 2/07* (2006.01)

(52) U.S. Cl.
CPC ......... *B60N 2/0875* (2013.01); *B60N 2/0705* (2013.01)

(58) Field of Classification Search
CPC ... B60N 2/0875; B60N 2/0806; B60N 2/0705
USPC ...................................................... 248/429
See application file for complete search history.

(56) References Cited

U.S. PATENT DOCUMENTS

| 4,856,847 | A * | 8/1989 | Kanai ................... | B60N 2/123 248/429 |
| 5,052,751 | A * | 10/1991 | Hayakawa ............ | B60N 2/123 248/429 |
| 6,637,712 | B1 * | 10/2003 | Lagerweij ............ | B60N 2/0705 248/429 |
| 7,506,856 | B2 * | 3/2009 | Ikegaya ............... | B60N 2/0705 248/419 |
| 7,669,825 | B2 * | 3/2010 | Sung ................... | B60N 2/0825 248/424 |
| 7,780,138 | B1 * | 8/2010 | Lee ..................... | B60N 2/0705 248/429 |
| 8,201,798 | B2 * | 6/2012 | Nihonmatsu ........ | B60N 2/0705 248/430 |
| 8,474,777 | B2 * | 7/2013 | Nihonmatsu ........ | B60N 2/0705 248/424 |

(Continued)

FOREIGN PATENT DOCUMENTS

| JP | H4-104026 U | 9/1992 |
| KR | 10-1299015 | 8/2013 |

*Primary Examiner* — Anita M King
(74) *Attorney, Agent, or Firm* — Brinks Gilson & Lione

(57) ABSTRACT

The present disclosure provides an apparatus for locking a vehicle seat-rail that improves the assembly convenience of a lever assembly and enhances space utilization of the seat-rail upper portion, and an assembling method. The apparatus includes a fixing bracket that is fixed to an outer surface of a moving rail; and an unlock lever that is rotatably coupled to the fixing bracket at an interruption. In particular, a rotation stopper is formed to protrude from a side surface of the unlock lever, and a fixing stopper is provided in a rotation path of the rotation stopper to regulate the excessive rotation of the unlock lever in one direction at the time of rotation of the unlock lever.

11 Claims, 8 Drawing Sheets

(56) References Cited

U.S. PATENT DOCUMENTS

| | | | | |
|---|---|---|---|---|
| 2004/0124683 A1* | 7/2004 | Matsumoto | B60N 2/0705 | 297/344.1 |
| 2006/0071140 A1* | 4/2006 | Kim | B60N 2/0705 | 248/430 |
| 2009/0178508 A1* | 7/2009 | Kanda | B60N 2/0818 | 74/491 |
| 2012/0294674 A1* | 11/2012 | Lee | B60N 2/0705 | 403/322.4 |
| 2013/0112833 A1* | 5/2013 | Kim | B60N 2/0705 | 248/429 |
| 2015/0258915 A1* | 9/2015 | Kim | B60N 2/0705 | 248/429 |
| 2016/0185260 A1* | 6/2016 | Kim | B60N 2/0806 | 248/429 |

* cited by examiner

FIG. 1 "Prior Art"

APPARATUS FOR LOCKING SEAT-RAIL IN VEHICLE AND MANUFACTURING METHOD THEREOF

CROSS-REFERENCES TO RELATED APPLICATION

This application claims the benefit of Korean Patent Application No. 10-2014-0193206, filed on Dec. 30, 2014, which is hereby incorporated by reference in its entirety.

FIELD

The present disclosure relates to an apparatus for locking a vehicle seat-rail that improves the assembly convenience and enhances space utilization of the seat-rail, and an assembling method thereof.

BACKGROUND

The statements in this section merely provide background information related to the present disclosure and may not constitute prior art.

In general, seats installed in a vehicle can be adjusted while sliding forward and backward to match the passenger's body conditions, and an apparatus for locking the seat-rails for fixing the moved seat is installed below the seats.

FIG. 1 illustrates a "seat-rail locking apparatus" according to a prior art that is configured to include a low rail 110 that is coupled to a floor panel inside a passenger compartment, an upper rail 120 that is installed to slide along the low rail 110 while being coupled to the seat cushion frame, and a locking pin assembly 200 that restrains the free movement of the upper rail 120 relative to the low rail 110.

Further, the locking pin assembly 200 is provided with a pin member 210 through the upper end of the upper rail 120, and a lower end portion of the pin member 210 is fitted to a locking hole 111 formed in the low rail 110 to constrain the sliding movement of the upper rail 120, thereby being able to fix the forward and backward movements of the seat.

Here, a rotationally operated locking lever 300 is installed on the side surface of the upper rail 120, and the end portion of the locking lever 300 is configured to be caught in the pin member 210 protruding to the upper side of the upper rail 120.

Therefore, when rotationally operating the locking lever, while the pin member caught in the end portion of the locking lever is moved upward toward the upper portion, the lower end portion of the pin member is disengaged from the locking hole, thereby making it possible to move the seat back and forth, while allowing the sliding movement of the upper rail with respect to the low rail.

However, in the conventional seat-rail locking apparatus, since the end portion of the locking lever is located above the upper rail and the locking lever is fitted to the pin member, an amount of protrusion of the upper end of the pin member protruding to the upper side of the upper rail increases.

To solve this problem, a structure configured so that the unlocking operation of the locking lever and the pin member is performed inside the seat-rail is suggested. However, in this case, since the lower end portion of the locking pin and the end portion of the locking lever should be inserted into the seat-rail, the locking pin and the locking lever are separately assembled to the seat-rail, thereby reducing the assembling and operating convenience of the components for forming the locking apparatus.

The above-mentioned matters described as the background art are only for understanding of the background of the present disclosure, but should not be recognized as corresponding to the already known prior art to those of ordinary skill in the art.

SUMMARY

The present disclosure provides an apparatus for locking a vehicle seat-rail which reduces interference with the seat-rail, while assembling the locking pin and the locking lever to the seat-rail at a time, thereby improving convenience associated with the assembling operation, and a method of assembling the same.

Another aspect of the present disclosure is to provide an apparatus for locking a vehicle seat-rail which enhances space usability of the seat-rail upper portion and reduces the exposure of the components to the outside, by providing that the unlocking operation of the locking pin is performed in a space in the upper rail, and a method of assembling the same.

According to one form of the present disclosure, there is provided an apparatus for locking a vehicle seat-rail that includes a fixing bracket that is fixed to an outer surface of a moving rail; and an unlock lever that is rotatably coupled to the fixing bracket at an interruption, wherein a rotation stopper is formed to protrude from a side surface of the unlock lever, a fixing stopper is provided in a rotation path of the rotation stopper to regulate the excessive rotation of the unlock lever in one direction at the time of rotation of the unlock lever.

The unlock lever is provided so that one end portion is located outside the moving rail and the other end is located inside the moving rail; the rotation stopper is formed between the interruption and the one end portion of the unlock lever; and the fixing stopper may be configured so that the unlock lever is formed at the upper end position of the pivotally coupled portion, and the rotation stopper is caught in the fixing stopper when one end portion of the unlock lever rotates toward the upper end portion of the fixing bracket.

Lever coupling portions are formed to protrude from the both side ends of the fixing bracket; the interruption of the unlock lever is pivotally coupled between the lever connecting portions; and the fixing stopper may be formed to protrude from the upper end of the lever coupling portion.

A circular pinhole is formed at the intermediate of the lever connecting portion; a hinge pin is coupled to the interruption of the unlock lever; both end portions of the hinge pin are coupled through the pinhole, thereby preventing detachment of the hinge pin coupled to the pinhole.

A lever assembly constituted by coupling of the unlock lever to the side portion of the fixing bracket while the locking pin passing through the fixing bracket is assembled in a module; each of an upper engaging window and side engaging window is formed at the upper end portion and the side end portion of the moving rail; and when assembling the lever assembly to the moving rail, the fixing bracket may be fixed to the outer upper surface and side surface of the moving rail formed around the engaging windows, while the lower end portion of the locking pin is inserted into the upper engaging window, and the other end portion of the unlock lever is inserted into the side engaging window.

An unlock flange is formed at the interruption of the locking pin; and the unlock flange can be configured to be located in the inner space of the moving rail, when assembling the lever assembly to the moving rail.

A plurality of locking pins is provided, the other end portion of the unlock lever is formed in a fork shape, and the other end portion of the unlock lever is caught in the bottom of the unlock flange during the rotation operation of the unlock lever to move the locking pin up and down.

According to another aspect of the present disclosure, there is provided a method of assembling an apparatus for locking a vehicle seat-rail, the method includes preparing a lever assembly in which a locking pin and an unlock lever are coupled to a fixing bracket in a module; and assembling the lever assembly to a moving rail by inserting a lower end portion of the locking pin to an upper engaging window formed at an upper end portion of the moving rail, and by inserting a lower end portion of the unlock lever to a side engaging window formed at a side end portion of the moving rail.

In the preparation, the lever assembly may be modularized so that the locking pin is provided through one side portion of the fixing bracket and the unlock lever is coupled to the other side portion of the fixing bracket.

The locking pin vertically penetrates with respect to the fixing bracket, the lower end portion of the locking pin is disposed to face the upper engaging window when assembled to the moving rail; and the unlock lever is rotatably coupled to the fixing bracket in a state of being diagonal to the lock pin, and the lower end portion of the unlock lever may be disposed to face the side engaging window when assembled to the moving rail.

A rotation stopper is formed to protrude from the side surface of the unlock lever, and a fixing stopper is provided in a rotation path of the rotation stopper to regulate excessive rotation of the unlock lever in a nearly perpendicular direction at the time of rotation of the unlock lever.

In the assembling, the fixing bracket can be fixed to the outer upper surface and side surface of the moving rail formed around the engaging windows, while the lower end portion of the locking pin and the lower end portion of the unlock lever are inserted into the upper engaging window and the side engaging window.

Through the above-described solving means, according to the present disclosure, since the one end portion of the unlock lever is inhibited from being excessively rotated in the direction toward the upper end portion of the fixing bracket, it is possible to appropriately regulate the position of the other end portion of the unlock lever. Therefore, when assembling the lever assembly to the moving rail, since the locking pin and the unlock lever are simultaneously inserted into the engaging windows formed in the moving rail without interfering with the moving rail, there is an effect of greatly improving the assembly convenience of the lever assembly.

Further, since the upward movement operation of the locking pin is performed within the inner space of the seat-rail, the components attached or exposed to the outside of the seat-rail are reduced to enhance the space utilization of a space formed at the top of the moving rail, and thus, there is also an effect capable of designing a compact seat-rail.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 6A:
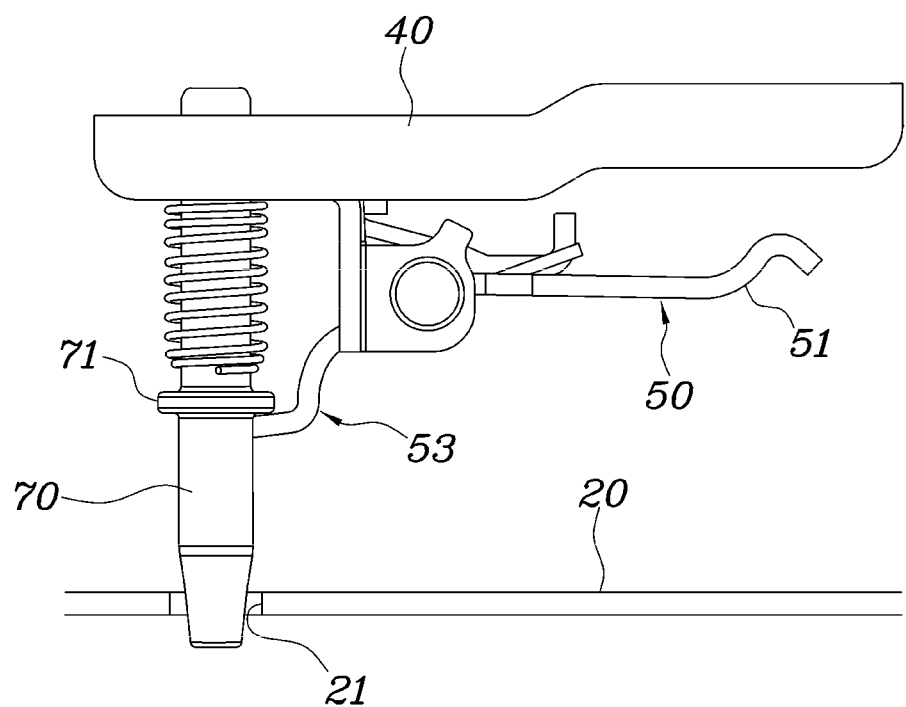
Figure 7:
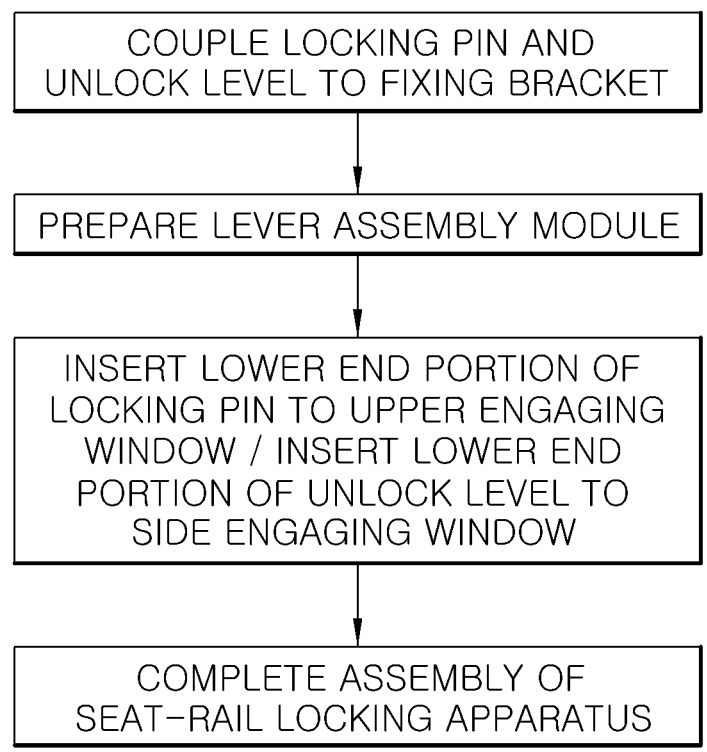

FIGS. 6A and B are diagrams illustrating states before and after the locking operation using the seat-rail locking apparatus; and FIG. 7 is a flow chart of assembling of the seat-rail locking apparatus.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

It will be understood that although the terms "first", "second", etc. are used herein to describe various elements, these elements should not be limited by these terms. These terms are only used to distinguish one element from another element.

Figure 1:
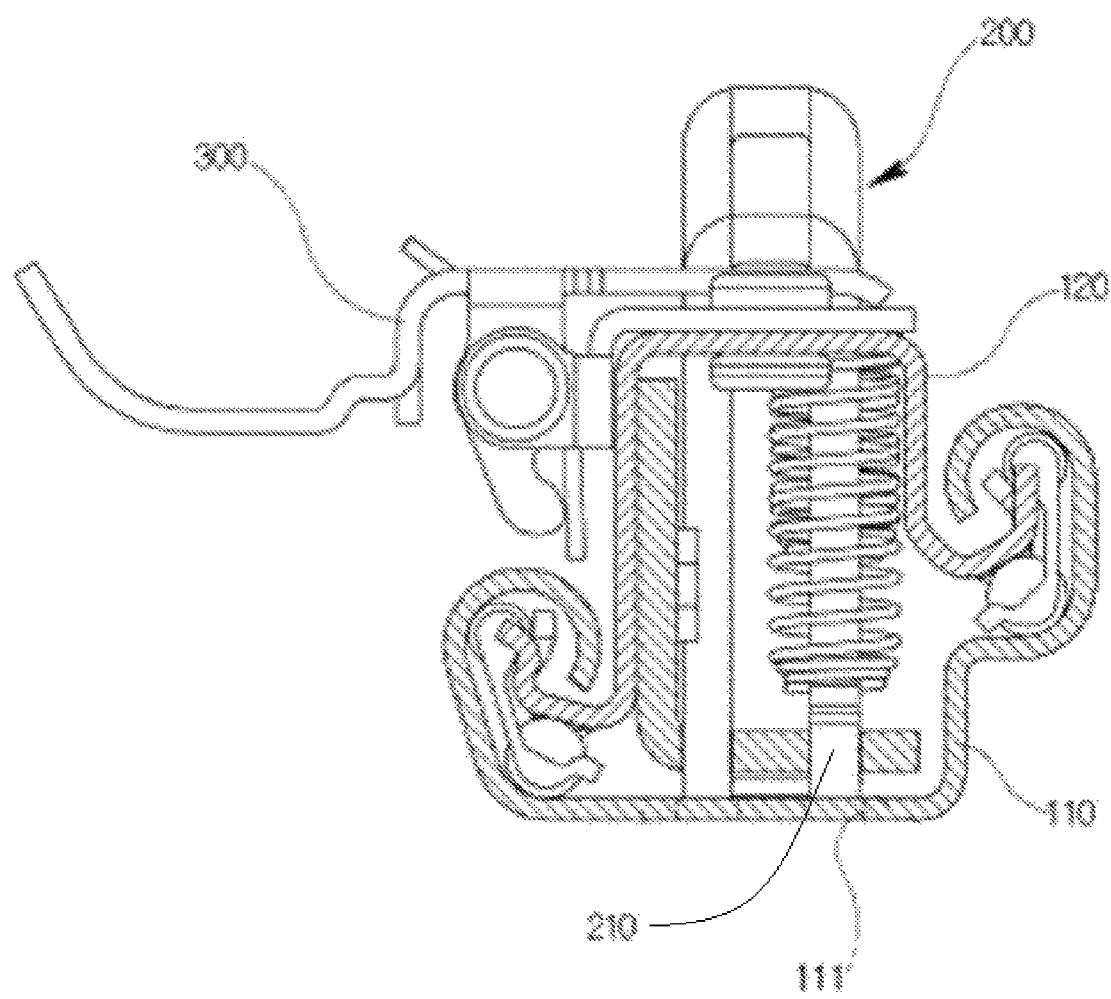
FIG. 1 is a diagram for explaining a structure of a seat-rail locking apparatus according to a related art.
Figure 2:
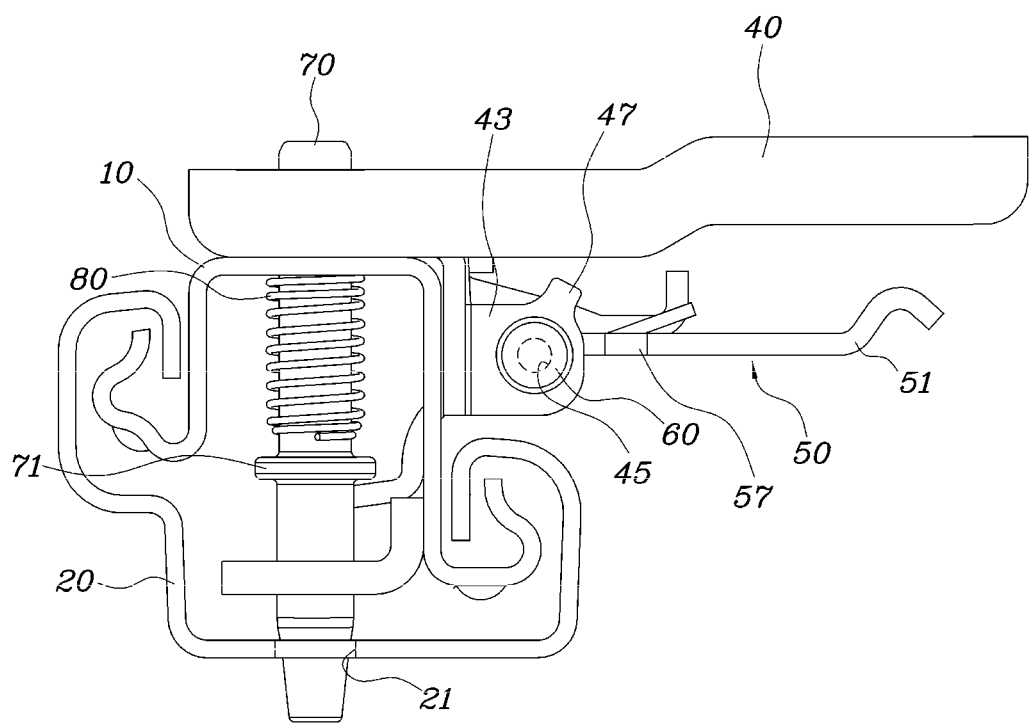
FIG. 2 is a diagram for explaining a structure of a seat-rail locking apparatus.

Referring to FIG. 2, a seat-rail locking apparatus of the present disclosure is configured to largely include a fixing bracket 40 and an unlock lever 50.

The coupling and operating relation between the moving rail 10 and the fixed rail 20 will be briefly described with reference to FIG. 2. The fixed rail 20 is coupled to a floor panel (not illustrated) in a passenger compartment in a front and rear lengthwise direction, and the moving rail 10 is installed to slide along the fixed rail 20, while being coupled to a seat cushion frame (not illustrated).

Further, a plurality of locking holes 21 may be formed at the horizontally formed lower end portion of the fixed rail 20 along its length at regular intervals, and a plurality of locking pins 70 may be provided by being inserted in an upper engaging window 11 formed in the upper end portion of the moving rail 10 formed to face the fixed rail 20 side by side along its lengthwise direction.

Further, an operating portion 51 is formed at the one end portion of the unlock lever 50, a hinge portion 55 is formed at an interruption, and a fork portion 53 is formed at the other end portion. Thus, at the time of pushing operation of the operating portion 51, the fork portion 53 is rotationally operated around the hinge portion 55.

Thus, at the time of the rotational operation of the unlock lever 50, the fork portion 53 formed at the other end portion is operated to raise the locking pin 70 upward to move the locking pin 70 upward, and thus, the locking pin 70 is separated from the locking hole 21 of the fixed rail 20 to unlock the seat-rail.

At this time, the hinge portion 55 can be formed in a structure that wraps around the hinge pin 60 so that the hinge pin 60 described later is inserted and the unlock lever 50 can pivot about the hinge pin. Also, the fork portion 53 can be formed so that a plurality of fork pins is spaced at predetermined intervals, the fork pin is between the locking pins 70, and the fork pins can be formed to be smaller by one than the number of the locking pins.

Meanwhile, referring to FIGS. 2 and 3, the fixing bracket 40 is provided in a shape to partially cover the upper surface and the side surface of the moving rail 10, and the unlock lever 50 and the locking pin 70 described below are coupled to each other to form the lever assembly 30.

The interruption of the unlock lever 50 is rotatably and pivotally coupled to the fixing bracket 40.

At this time, a rotation stopper 57 is formed to protrude from the side surface of the unlock lever 50, and a fixing stopper 47 is provided in a rotation path of the rotation stopper 57 to regulate that excessive rotation of the unlock lever 50 in one direction.

Figure 4:
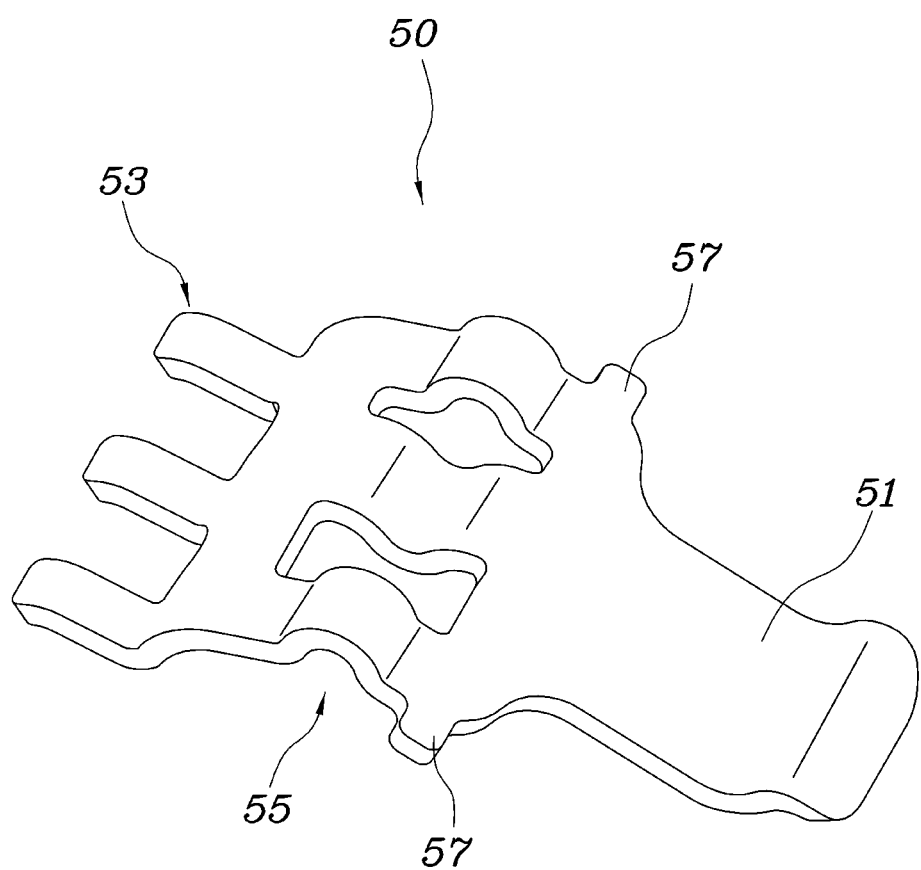
FIG. 4 is a diagram for explaining a shape of the unlock lever.

For example, as illustrated in FIGS. 2 and 4, the unlock lever 50 is provided so that, when assembled to the moving rail 10, the operating portion 51 formed at one end portion is located outside the moving rail 10 and the fork portion 53 formed at the other end portion is located inside the moving rail 10.

Thus, the rotation stopper 57 may be formed on the side surface toward one end portion at the interruption of the unlock lever 50, and the fixing stopper 47 may be configured so that the unlock lever 50 is formed at the upper end position of the pivotally coupled portion, and the rotation stopper 57 is caught in the fixing stopper 47 when the one end portion of the unlock lever 50 rotates toward the upper end portion of the fixing bracket 40.

Here, the lever coupling portions 43 are formed to protrude from both side ends of the fixing bracket 40, and the interruption of the unlock lever 50 is pivotally coupled between the both lever connecting portions 43. According to this, the fixing stopper 47 may be formed to protrude from the upper end of the lever coupling portion 43.

That is, according to the configuration described above, before the fixing bracket 40 is assembled to the moving rail 10, in a state in which the unlock lever 50 is pivotally coupled to the lever coupling portion 43, the rotation stopper 57 formed in the unlock lever 50 is caught in the fixing stopper 47 formed in the lever coupling portion 43.

Thus, the one end portion of the unlock lever 50 is inhibited from being excessively rotated in the direction toward the upper end portion of the fixing bracket 40, thereby being able to appropriately regulate the position of the other end portion of the unlock lever 50. Thus, in the future, when the lever assembly 30 including the fixing bracket 40, the unlock lever 50 and the locking pin 70 is assembled to the moving rail 10, the unlock lever 50 and the locking pin 70 can be assembled by being simply inserted into the moving rail 10.

Figure 3:
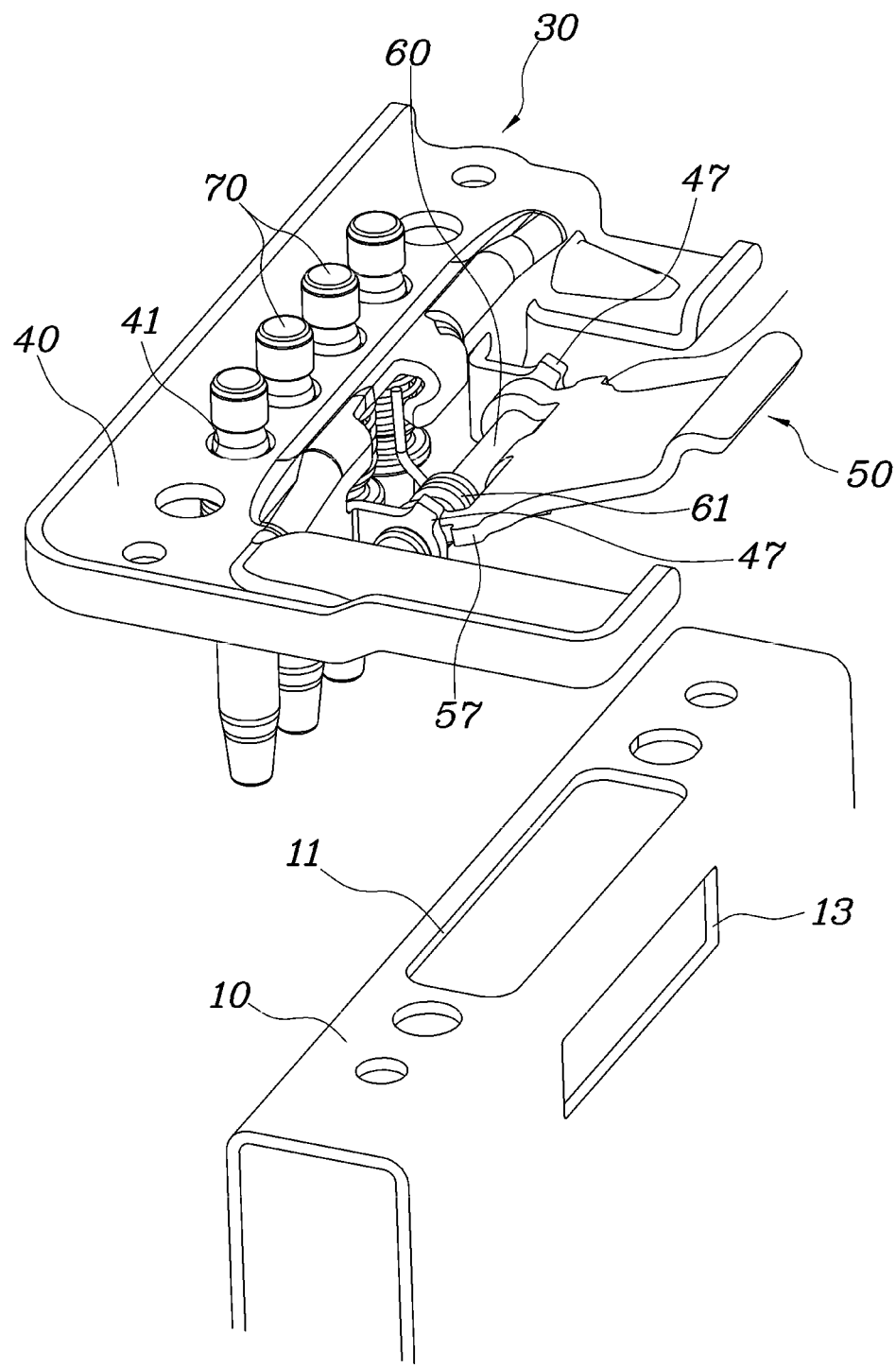
FIG. 3 is a diagram illustrating a state in a lever assembly and a moving rail are disassembled in the seat-rail locking apparatus.

In addition, referring to FIGS. 2 and 3, a circular pinhole 45 is formed at the intermediate of the lever coupling portion 43, and the hinge pin 60 can be coupled to the interruption of the unlock lever 50. At this time, an unlock restoring spring 61 can be prepared in the hinge pin 60 to provide an elastic restoring force to the unlocking rotation direction of the unlock lever 50. Here, one end of the unlock restoring spring 61 can be supported on a bottom surface of one end portion of the unlock lever 50, and the other end of the unlock restoring spring 61 can be supported on a part of the fixing bracket 40.

In particular, since the both end portions of the hinge pin 60 is coupled through the pinhole 45, the detachment of the hinge pin 60 coupled to the pin hole 45 may be avoided.

That is, since only the pin hole 45 is formed on the lever coupling portion 43, after assembling by inserting the hinge pin 60 to the pinhole 45, the hinge pin 60 may not be detached from the pin hole 45.

Figure 5:
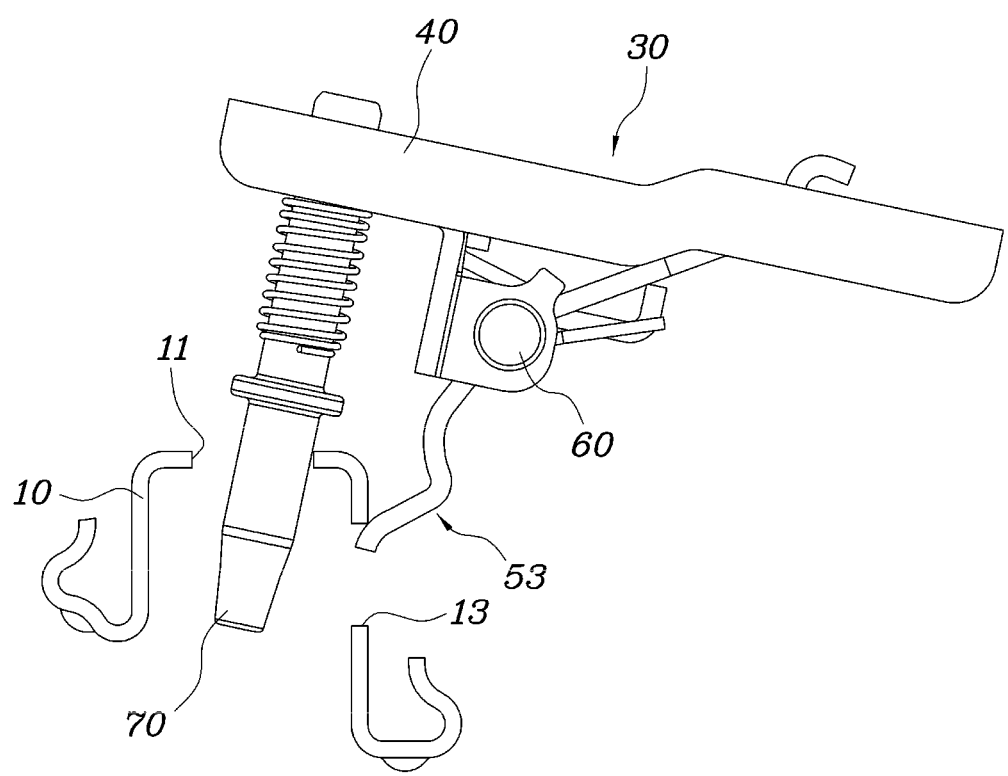
FIG. 5 is a diagram for explaining a method of assembling the lever assembly to the moving rail in the seat-rail locking apparatus.

Meanwhile, referring to FIGS. 3 and 5, while the lower end portion of the locking pin 70 penetrates the fixing bracket 40, the unlock lever 50 is coupled to the side portion of the fixing bracket 40 to form the lever assembly 30, and the lever assembly 30 may be assembled in a module.

Further, the upper engaging window 11 and the side engaging window 13 may be formed in the corresponding upper end portion and/or side end portion of the moving rail 10 in an open shape. At this time, since a section between both the lever coupling portions 43 corresponding to the hinge pin 60 is also formed in an open shape, the open portion can be assembled with the side engaging window 13 in an overlapping manner, and the other end portion of the unlock lever 50 can be inserted into the side engaging window 13.

According to this, when assembling the moving rail 10 to the lever assembly 30, the lower end portion of the locking pin 70 is inserted to the upper engaging window 11, and at the same time, the other end portion of the unlock lever 50 is inserted to the side engaging window 13. Thus, since the fixing bracket 40 is fixed in a state of surface contact to the outside upper surface and the side surface of the moving rail 10 formed around the upper engaging window 11 and the side engaging window 13 through the simple assembly of the lever assembly 30, it is possible to improve the assembling convenience of the lever assembly 30.

Figure 6B:
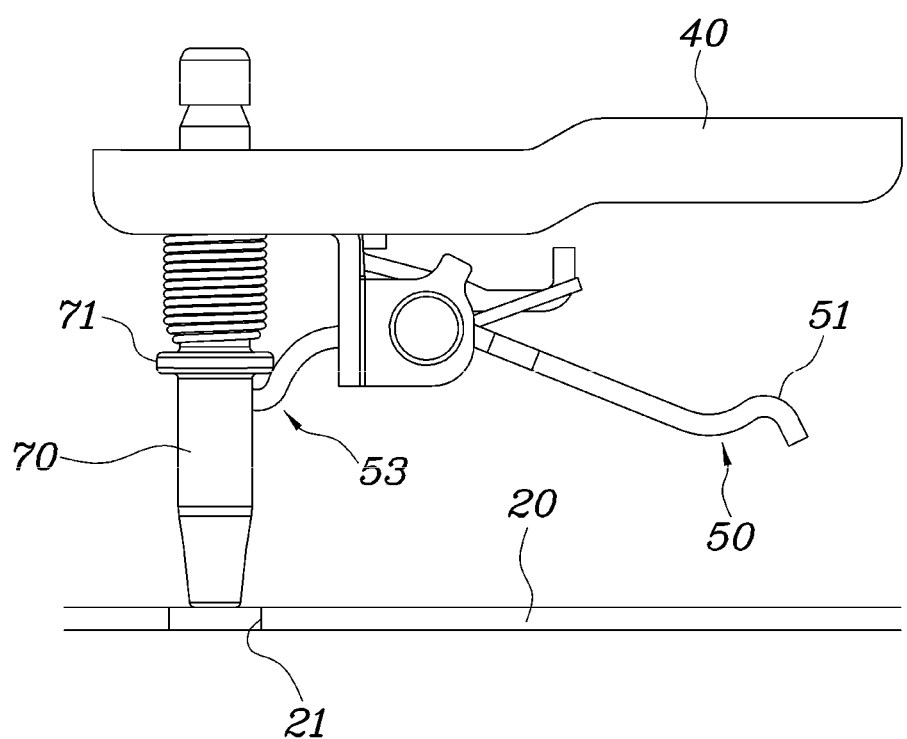

Meanwhile, referring to FIGS. 2 and 6A and 6B, the unlock flange 71 may be formed at the interruption of the locking pin 70, and when assembling the lever assembly 30 to the moving rail 10, the unlock flange 71 is located in the inner space of the moving rail 10.

For example, a number of guide holes 41 are formed at the end portion of the fixing bracket 40 along the lengthwise direction in which the moving rail 10 is moved, the locking pins 70 are each provided in the guide holes 41, and a large number of locking pins 70 can be provided in the fixing bracket 40. At this time, a structure that allows the upper and lower guide movement of the locking pin 70 but inhibits detachment of the locking pin 70 from the guide hole 41 may be separately prepared between the guide hole 41 and the locking pin 70.

Further, a fork-shaped fork portion 53 is formed at the other end portion of the unlock lever 50, the other end portion of the unlock lever 50 is caught in the bottom of the unlock flange 71 to vertically move the locking pin 70 at the time of rotational movement of the unlock lever 50, and thus, the locking pin 70 can be locked or unlocked to the locking hole 21 formed in the fixed rail 20.

At this time, a locking restoring spring 80 may be provided between the upper face of the unlock flanges 71 and the bottom surface of the fixing bracket 40 to provide an elastic restoring force to the movement direction of the locking pin 70 that is moved upward.

According to this configuration, the fork portion 53 of the unlock lever 50 and the unlock flange 71 portion of the locking pin 70 are disposed inside the seat-rail, and the upward moving operation of the locking pin 70 is also performed within the inner space of the seat-rail, thereby reducing the components attached or exposed to the outside of the seat-rail. Thus, it is possible to provide a compact design of the seat-rail by enhancing the upper space utilization of the moving rail 10, and it is possible to improve marketability of the seat-rail locking apparatus.

Meanwhile, a method for assembling the apparatus for locking the vehicle seat-rail of the present disclosure described earlier may include a preparing step and an assembling step.

Referring to FIGS. 5 and 7, first, at the preparing step, it is possible to prepare the lever assembly 30 in which the locking pin 40 and the unlock lever 50 are coupled to the fixing bracket 70 in a module.

For example, since the lever assembly 30 is configured so that the locking pin 70 is provided through one side portion of the fixing bracket 40 and the unlock lever 50 is coupled to the other side portion of the fixing bracket 40, the lever assembly 30 can be prepared in a module.

At this time, since the locking pin 70 penetrates with respect to the fixing bracket 40 in a vertical state, when assembling the locking pin 70 to the moving rail 10, the lower end portion of the locking pin 70 can be disposed to face the upper engaging window 11.

Further, the unlock lever 50 is rotatably coupled to the fixing bracket 40 in a state of being oblique with respect to the vertically coupled locking pin 70, and in one form, in a state in which its lower end portion is obliquely inclined toward the lower end portion of the locking pin 70. Thus, when assembling the unlock lever 50 to the moving rail 10, the lower end portion of the unlock lever 50 may be disposed to face the side engaging window 13.

That is, according to the above-described configuration, since the lower end portion of the locking pin 70 is vertically arranged toward the upper engaging window 11, and the lower end portion of the unlock lever 50 is obliquely arranged toward the side engaging window 13, when assembling the lever assembly 30 to the moving rail 10, the locking pin 70 and the unlock lever 50 can assembled to the moving rail 10 at a time.

In particular, it is possible to add a structure that restricts the unlock lever 50 from being excessively rotated in one direction.

For example, the rotation stopper 57 is formed to protrude from the side surface of the unlock lever 50, and the fixing stopper 47 is provided in the rotation path of the rotation stopper 57 to regulate the excessive rotation of the unlock lever 50 in the nearly vertical direction at the time of rotation of the unlock lever 50.

That is, before assembling the lever assembly 30 to the moving rail 10, when the excessive rotation of the unlock lever 50 is not regulated and the unlock lever 50 rotates nearly vertically, since the lower end portion of the unlock lever 50 does not face the side engaging window 13, an operator performs a work of holding the lower end portion of the unlock lever 50 and pushing it into the side engaging window 13 at the time of assembling work, and thus, there is a problem of declines in assembling characteristics and assembly convenience of the locking apparatus.

Therefore, in the case of the present disclosure, before assembling the lever assembly 30 to the moving rail 10 through a stopper structure, by maintaining a state in which the lower end portion of the unlock lever 50 faces the side engaging window 13, the working convenience for assembling the lever assembly 30 to the moving rail 10 is improved.

Next, at the assembling step, the lower end portion of the locking pin 70 is inserted into the upper engaging window 11 formed at the upper end portion of the rail, and at the same time, the lower end portion of the unlock lever 50 is inserted into the side engaging window 13 formed at the side end portion of the moving rail 10, thereby being able to assembling the lever assembly 30 to the moving rail 10 at a time.

For example, since the lower end portion of the locking pin 70 and the lower end portion of the unlock lever 50 are inserted into the upper engaging window 11 and the side engaging window 13, the fixing bracket 40 can be fixed to the outer upper surface and the side surface of the moving rail 10 formed around the engaging window.

According to such a configuration, it is possible to appropriately regulate the position of the other end portion of the unlock lever 50 so that the other end portion of the unlock lever 50 is not deviated in a direction other than the direction facing the side engaging window 13. Therefore, when assembling the lever assembly 30 to the moving rail 10, since the locking pin 70 and the unlock lever 50 are simultaneously inserted into the engaging windows formed in the moving rail 10 without interfering with the moving rail 10, there is an effect of improving the assembly convenience of the lever assembly.

While the present disclosure has been illustrated and described with reference to exemplary forms thereof, it will be understood by those skilled in the art that various changes in form and details may be made therein without departing from the spirit and scope of the present disclosure.

What is claimed is:

1. An apparatus for locking a vehicle seat-rail, comprising:
   a fixing bracket fixed to an outer surface of a moving rail; and
   an unlock lever configured to be rotatably coupled to the fixing bracket at an interruption,
   wherein a rotation stopper is formed to protrude from a side surface of the unlock lever, and a fixing stopper is provided in a rotation path of the rotation stopper that is configured to regulate an excessive rotation of the unlock lever in one direction at a time of rotation of the unlock lever.

2. The apparatus of claim 1, wherein one end portion of the unlock lever is located outside the moving rail and the other end portion of the unlock lever is located inside the moving rail,
   wherein the rotation stopper is formed between the interruption and one of the end portions of the unlock lever, and
   wherein the fixing stopper is configured so that the unlock lever is formed at an upper end position of a pivotally coupled portion, and the rotation stopper is configured to be caught in the fixing stopper when one of the end portions of the unlock lever rotates toward an upper end portion of the fixing bracket.

3. The apparatus of claim 2, wherein lever coupling portions are formed to protrude from both side ends of the fixing bracket, and an interruption of the unlock lever is pivotally coupled between lever connecting portions, and
   wherein the fixing stopper is formed to protrude from an upper end of the lever coupling portions.

4. The apparatus of claim 3, wherein a circular pinhole is formed at an intermediate of the lever connecting portions, and a hinge pin is configured to couple to the interruption of the unlock lever, and wherein both end portions of the hinge pin are configured to be coupled through the circular pinhole so as to inhibit detachment of the hinge pin coupled to the circular pinhole.

5. The apparatus of claim 2, wherein a lever assembly is formed by coupling of the unlock lever to a side portion of the fixing bracket while a locking pin that is configured to pass through the fixing bracket is assembled in a module, wherein an upper engaging window and a side engaging window is formed in a corresponding upper end portion and a side end portion of the moving rail, and wherein when assembling the lever assembly to the moving rail, the fixing bracket is fixed to an outer upper surface and a side surface of the moving rail formed around the engaging windows, while a lower end portion of the locking pin is inserted into the upper engaging window, and one of the end portions of the unlock lever is configured to be inserted into the side engaging window.

6. The apparatus of claim 5, wherein an unlock flange is formed at an interruption of the locking pin, and the unlock flange is configured to be located in an inner space of the moving rail, when assembling the lever assembly to the moving rail.

7. The apparatus of claim 6, wherein a plurality of locking pins are provided, and wherein one of the end portions of the unlock lever is formed in a fork shape, and the other end portion of the unlock lever is configured to be caught in a bottom of the unlock flange during a rotation operation of the unlock lever to move the locking pin up and down.

8. A method of assembling an apparatus for locking a vehicle seat-rail, the method comprising:

preparing a lever assembly in which a locking pin and an unlock lever are coupled to a fixing bracket in a module; and assembling the lever assembly to a moving rail by inserting a lower end portion of the locking pin to an upper engaging window formed at an upper end portion of the moving rail, and by inserting a lower end portion of the unlock lever to a side engaging window formed at a side end portion of the moving rail, wherein in the assembling step, the fixing bracket is fixed to an outer upper surface and a side surface of the moving rail formed around the engaging windows, while the lower end portion of the locking pin and the lower end portion of the unlock lever are configured to be inserted into the upper engaging window and the side engaging window.

9. The method of claim 8, wherein, in a preparation step, the lever assembly is modularized so that the locking pin is provided through one side portion of the fixing bracket and the unlock lever is coupled to other side portion of the fixing bracket.

10. The method of claim 9, wherein the locking pin is configured to vertically penetrate the fixing bracket, and the lower end portion of the locking pin is disposed to face the upper engaging window when assembled to the moving rail, and wherein the unlock lever is rotatably coupled to the fixing bracket in a state of being diagonal to the locking pin, and the lower end portion of the unlock lever is disposed to face the side engaging window when assembled to the moving rail.

11. The method of claim 10, wherein a rotation stopper is formed to protrude from a side surface of the unlock lever, and a fixing stopper is provided in a rotation path of the rotation stopper that is configured to regulate excessive rotation of the unlock lever in a substantially perpendicular direction at a time of rotation of the unlock lever.

* * * * *